US008140822B2

(12) United States Patent
Jacobs et al.

(10) Patent No.: US 8,140,822 B2
(45) Date of Patent: Mar. 20, 2012

(54) SYSTEM AND METHOD FOR MAINTAINING PAGE TABLES USED DURING A LOGICAL PARTITION MIGRATION

(75) Inventors: Stuart Zachary Jacobs, Lakeville, MN (US); David Anthony Larson, Rochester, MN (US); Naresh Nayar, Rochester, MN (US); Jonathan Ross Van Niewaal, Rochester, MN (US); Kenneth Charles Vossen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 685 days.

(21) Appl. No.: 11/735,830

(22) Filed: Apr. 16, 2007

(65) Prior Publication Data
US 2008/0256327 A1 Oct. 16, 2008

(51) Int. Cl.
*G06F 12/00* (2006.01)
(52) U.S. Cl. ......... 711/207; 711/147; 711/203; 711/205
(58) Field of Classification Search .................. 711/147, 711/203, 205, 207
See application file for complete search history.

(56) References Cited

U.S. PATENT DOCUMENTS

| 5,440,727 | A | 8/1995 | Bhide et al. |
| 5,636,373 | A | 6/1997 | Glendening et al. |
| 5,918,040 | A | 6/1999 | Jarvis |
| 6,044,447 | A | * | 3/2000 | Averill et al. ................. 711/207 |
| 6,209,106 | B1 | 3/2001 | Kubala et al. |
| 6,510,496 | B1 | * | 1/2003 | Tarui et al. .................... 711/147 |
| 7,356,679 | B1 | 4/2008 | Le et al. |
| 7,356,725 | B2 | 4/2008 | Engler et al. |
| 7,484,208 | B1 | 1/2009 | Nelson |
| 7,984,150 | B2 | 7/2011 | Hughes et al. |
| 2003/0233479 | A1 | 12/2003 | Keohane et al. |
| 2004/0205745 | A1 | 10/2004 | Piazza |
| 2006/0037027 | A1 | 2/2006 | Carlson et al. |
| 2006/0133426 | A1 | 6/2006 | Craddock et al. |
| 2007/0006227 | A1 | 1/2007 | Kinney et al. |
| 2007/0011495 | A1 | 1/2007 | Armstrong et al. |
| 2008/0120518 | A1 | 5/2008 | Ritz et al. |
| 2008/0163239 | A1 | 7/2008 | Sugumar et al. |
| 2009/0013149 | A1 | * | 1/2009 | Uhlig et al. .................... 711/207 |

* cited by examiner

*Primary Examiner* — Yong Choe
(74) *Attorney, Agent, or Firm* — Wood, Herron & Evans LLP; James R. Nock

(57) ABSTRACT

Maintaining data integrity for a logical partition by enabling nonintrusive switching of page tables used during a migration of the logical partition from a source computer system to a target computer system. A first page table stores a plurality of page entries made within a logically partitioned environment. A second page table stores one or more page entries generated during the migration. After migration, the processor page table pointer is switched to point to the first page table. A page entry in the second page table corresponding to a page entry made to the first page table by the logical partition may be invalidated in response to a page table hypervisor call made by the logical partition. In parallel, a plurality of entries generated during the migration of the logical partition in the second page table may be read through and invalidated.

19 Claims, 2 Drawing Sheets

SYSTEM AND METHOD FOR MAINTAINING PAGE TABLES USED DURING A LOGICAL PARTITION MIGRATION

CROSS-REFERENCE TO RELATED APPLICATIONS

This application is related to the following U.S. Patent Applications all filed on even date herewith, the disclosures of which are incorporated by reference herein: Ser. No. 11/735,809, entitled "SYSTEM AND METHOD FOR TRACKING THE MEMORY STATE OF A MIGRATING LOGICAL PARTITION" by William Joseph Armstrong et al.; Ser. No. 11/735,750, entitled "SYSTEM AND METHOD FOR UPDATING A TIME-RELATED STATE OF A MIGRATING LOGICAL PARTITION" by William Joseph Armstrong et al.; and Ser. No. 11/735,770 entitled "SYSTEM AND METHOD FOR DETERMINING FIRMWARE COMPATIBILITY FOR MIGRATING LOGICAL PARTITIONS" by William Joseph Armstrong et al.

FIELD OF THE INVENTION

The present invention relates to computing systems, and more particularly, to managing a logical partition migration between computer systems.

BACKGROUND OF THE INVENTION

Data migration refers generally to the processes of moving computer data from one computer location to another. For instance, an administrator may facilitate maintenance or updates by transferring applications and/or memory from one operating system or computer to another. While necessary, data migration can pose a tremendous challenge and risk to businesses, government agencies and individuals that depend upon uninterrupted computer access. Too often, software installation problems occur. Such problems may be attributable to faulty program code or unforeseeable interactions within a processing environment. For example, stored data may be lost or corrupted during the transfer. Such problems can result in costly system errors and downtime.

Problems relating to data transfers may be compounded in logically partitioned environments, where unique resource sharing and access practices may present additional considerations. Logical partitioning provides a programmed architecture suited for assigning and sharing computing assets. A partition may logically comprise a portion of a machine's physical processors, memory and other resources. As such, an administrator may allocate the same resources to more than one partition. Each partition may additionally host an operating system, in addition to multiple virtual processors. An underlying program called a hypervisor, or partition manager, assigns and dispatches physical processors to each virtual processor. In logical partitioned computing systems, a partition processor normally makes many hypervisor calls for services. Each partition typically has unique connections for communicating with a network. In this manner, each partition operates largely as if it is a separate computer.

During a migration, the state of the migrating logical partition, including applicable memory, processor/register state information, and connection information regarding physical interface/discs associated with the virtual partition components, etc., is transferred to another logical partition on another computer. The migration may be motivated to accommodate new hardware or program updates on the computer of the migrating logical partition. Oftentimes the migrated logical partition is eventually returned to the original logical partition location.

The migrating partition ideally continues work without interruption on the new logical partition. To this end, the migrating partition may run in a virtualized environment during the migration to be separate from the physical hardware underneath. The hypervisor may be responsible for providing the infrastructure that allows for the migration to occur from the source computer to the target computer, i.e., the source logical partition to a target logical partition. The target logical partition may be newly created for the migration, is typically located on a separate, physical computer, and is configured to accommodate the state of the transferred logical partition.

In scenarios where a logical partition is migrating to another server computer, it is necessary to account for and otherwise preserve storage operations, or page entries, affecting the state of the migrating logical partition. The preserved integrity of such entries may be necessary for the proper operation of the partition once it has migrated. Put another way, the state/entries for each page of a logical partition should be preserved or otherwise maintained during the migration to allow for a relatively seamless resumption of the migrated partition's work. For this same reason, the maintenance of partition pages should not require noticeable downtime of the computer system.

Failure to maintain the state of the migrating partition could lead to a partition outage or a lack of data integrity in the migrating partition. Any such problem resulting from an unsuccessful migration can result in the loss of business and man hours. Manually tracking of the overwhelming amount of memory updates would be preclusively slow, tedious and complicated. Such potential problems may further translate into a reluctance to migrate partitions in instances where such transfers would otherwise improve system performance.

There is consequently a need for an improved manner of migrating data and associated processes within a logically partitioned environment.

SUMMARY OF THE INVENTION

The present invention provides an apparatus, method and program product configured to maintain data integrity for a logical partition by enabling nonintrusive switching of page tables used during a migration of the logical partition. In one embodiment, a first page table is configured to store a plurality of page entries made within a logically partitioned environment. A second page table may be used during migration to store one or more page entries generated during the migration. Aspects of the invention may invalidate a page entry in the second page table corresponding to a page entry of the first page table.

Another aspect of the invention may involve reading through and invalidating in the second page table a plurality of entries generated during the migration of the logical partition. This reading through of the entries may be generated concurrently with the invalidation of the corresponding page entry in the second page table. Moreover, the reading of the entries may be accomplished in intervals and with portions of the plurality of entries.

Where so configured, the first page table may be updated with a plurality of page entries that correspond to the plurality of invalidated entries. A register that determines where subsequent page entries of the processor are sent may be pointed to the first page table. Invalidated entries may be flushed from the system.

Prior to the migration, entries from both the logical partition and the processor may be stored in the first page table page. The corresponding page entry to the second page table may be generated by directing the processor to send the corresponding page entry to the second page table. In one embodiment, this process is accomplished by pointing to the second page table a register that determines where subsequent page entries of the processor are sent.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Figure 1:
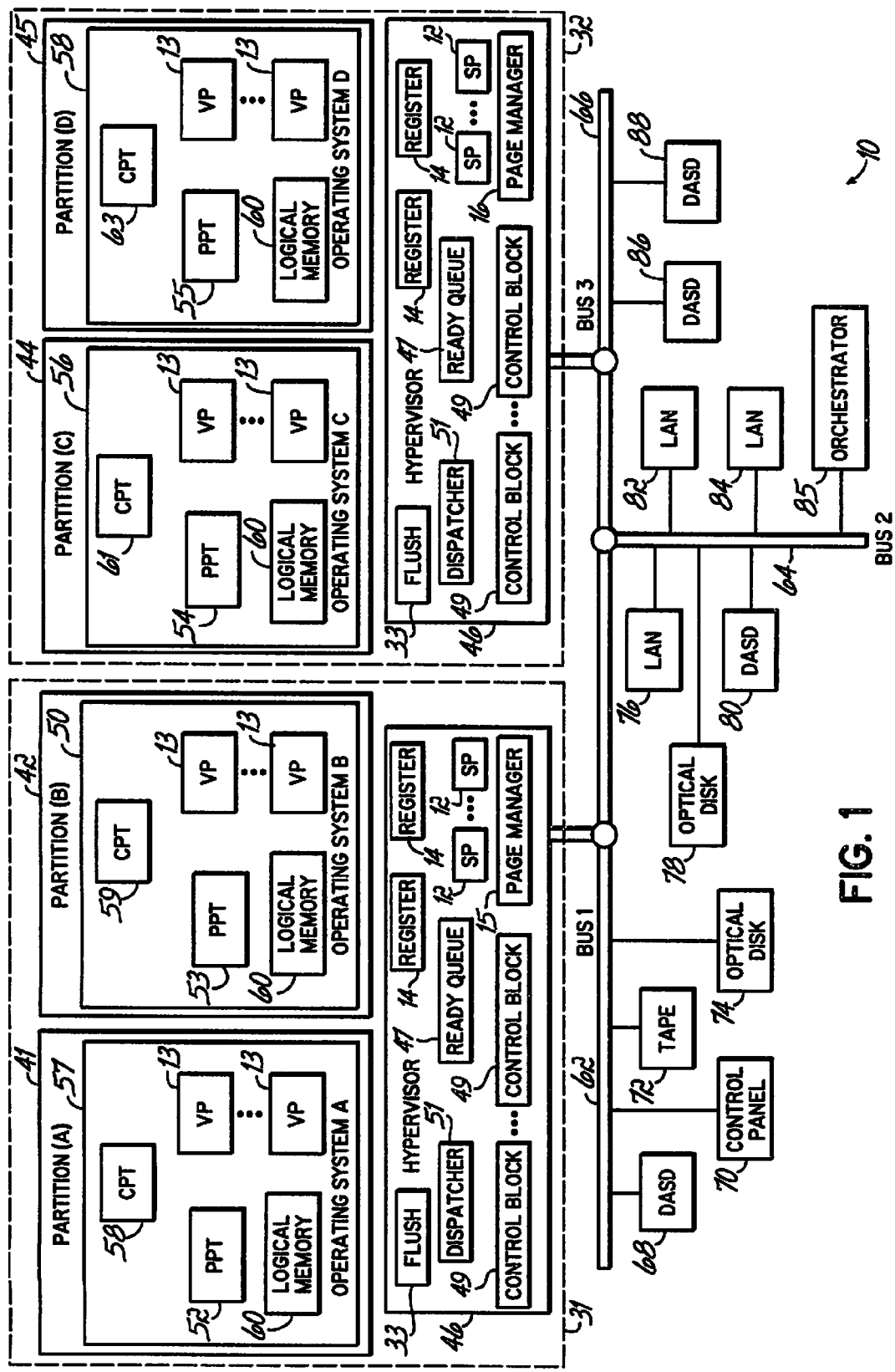
FIG. 1 is a block diagram of a computer system configured to enable nonintrusive switching of page tables used during a migration of a logical partition in accordance with the principles of the present invention.

Features of the present invention include an apparatus, program product and method for enabling nonintrusive switching of page tables used during a migration of a logical partition. In this manner, embodiments may automatically maintain memory for the migrating logical partition. Memory stores, or page table entries, from a page table used to facilitate migration may automatically be used to update entries used at the conclusion of a migration.

When migrating, a logical partition may advantageously run in a virtualized environment to be separate from the physical hardware underneath. The hypervisor may be responsible for providing the infrastructure that allows for the migration to occur from the source logical partition to a target logical partition. The target logical partition may be newly created for the migration, having a framework structure configured to accommodate the transferred logical partition.

The virtualized environment of the migrating partition may include virtualization of the page table, i.e., such that the page table is separate from the physical hardware underneath. When not migrating, a single page table is typically responsible for maintaining page entries of a partition. Processors may use the page table to transparently convert a program's virtual address into a physical address where that page has been mapped into physical memory. In embodiments of the present invention, this page table is referred to as the cache page table (CPT). The cache page table is furthermore the same table visible to and used for entries by both the migrating partition and the physical processor.

While operating in virtualized partition memory (VPM) mode during a migration, it is advantageous to use an additional page table to facilitate data stores. As such, embodiments may use a physical page table (PPT) to temporarily record entries from the processor until they can be updated at the cache page table.

Towards the end of a partition's migration, e.g., at a transition mode that may follow virtualized partition memory mode, the partition and processor may resume using the same page table, e.g., the cache page table. As such, all of the bit entries changed by the processor in the physical page table may be updated in their corresponding page table entries in the cache page table.

This configuration may allow the hypervisor to initially handle data and instruction storage interrupts for a partition. The hypervisor may further be enabled to explode the large page sizes into the typically smaller 4 Kbyte size of the physical page table. In this manner, the page tables, i.e., the cache page table and the physical page table, respectively visible to the partition and to the processor, are separated. The hypervisor may handle moving data between the page tables.

As such, the page table visible to the partition may remain the cache page table, while the page table visible to the processor may transition to the physical page table. While operating in virtualized partition memory mode during a migration, the system may provide hypervisor directed analogs of the storage interrupts, ISI (instruction storage interrupt) and DSI (data storage interrupt). This feature may allow the hypervisor to respond to page table misses. Embodiments thus may further allow the hypervisor to track page entries to the partition's memory, and in so doing, maintain a state for each page in the partition's memory.

When the migration of a partition is initiated, the partition may be switched into virtualized partition memory mode. The page table that the partition and the processors had been sharing may be designated as the cache page table, and a new page table may be setup as the physical page table. This may be accomplished by halting all of the migrating partition's processors and switching a processor register called SDR1 to point to the new physical page table. The SDR1 register may provide the processors with the location and size of the physical page table. As such, there may be no visible changes from the partition's point of view.

As the partition runs in virtualized partition memory mode and references memory, page entries may be added to the physical page table. As the partition's memory is referenced, the processors may update referenced, changed and tag set bits of the entries. These updates by the processor may modify the entries in only the physical page table. Such bits may generally indicate whether a page has been used, altered, or is in an unalterable state, respectively. Absent features consistent with embodiments of the invention, this scenario would create the potential for a disconnect between the entries in the cache page table and those of the physical page table. While in virtualized partition memory mode, the hypervisor may update these bits/entries in the cache page table when needed (i.e. when the partition requests to read an entry or an entry is invalidated in the physical page table).

Once the partition is switched out of virtualized partition memory mode, the partition and the processors may both resume using the same partition table, i.e., the cache page table, and the physical page table being used by the processors may no longer be used. This means that as part of the switch out of virtualized partition memory mode, all of the bits changed by the processors in the physical page table should be updated in their corresponding page entries in the cache page table.

Halting all of the partition's processors, and then updating all of the entries in the cache page table corresponding to the entries in the physical page table may take too long time to complete. That is, the operation of the partition may be noticeably interrupted and unavailable to the users. High level I/O timeouts may occur (e.g., network connections may drop).

Embodiments consistent with the invention minimize such problems by only requiring that the partition's processors be halted, if at all, for a very short duration to update the SDR1 register for each processor. After the updates of SDR1 register are completed, the partition may continue to run, and there may be no visible outage to the users or timeouts.

In operation, the migrating partition may be switched into virtualized partition memory mode. The mode may be entered by pointing the SDR1 register to the physical page table. Prior to the switch, the partition and processors may both use the cache page table as the active page table. Once in virtualized partition memory mode, the hypervisor may continue to have knowledge of the physical page table, while the partition continues to view the cache page table.

Following virtualized partition memory mode, embodiments may use a special transition mode to update the cache page table. More particularly, two operations may concurrently take place. First, for any table entry initiated by the partition, the hypervisor may go first to the physical page table and invalidate all page entries related to the page entry in the cache page table to which the partition request is related. For purpose of this disclosure, invalidation may refer to turning off a valid bit. This action may update the referenced, changed, and tags set bits in the cache page table entry with the information contained in the physical page table entry.

Concurrently, a background task (invisible to the partition) may make a single pass through the physical page table invalidating all valid entries, and updating their corresponding cache page table entries with the referenced, changed, and tags set bit information contained in the physical page table. The background task may run periodically or otherwise for relatively short periods of time so that it does not result in significant interruption. Once this background task reaches the end of the physical page table, all entries may have been invalidated by either the background task, or on demand due to partition activity. As such, the cache page table may be fully updated with the information included within the physical page table.

After the physical page table has been fully flushed (and all information contained in the physical page table has been updated in the cache page table), the logical partition may be switched out of virtualized partition memory mode. This may cause all of the processors to be synchronized in the hypervisor, but may not require an update to the SDR1 registers for each processor. The synchronization may not be visible to the logical partition. After the synchronization, the hypervisor may no longer maintain any knowledge of the physical page table. The above processes may not require the operations of the logical partition to be halted for a long period of time to exiting out of virtualized partition memory mode.

Hardware and Software Environment

Turning more particularly to the drawings, FIG. 1 illustrates a data processing system 10, or apparatus, configured to enable nonintrusive switching of page tables used during a migration of a logical partition in a manner that is consistent with principles of the present invention. System 10 more particularly represents the primary software components and resources used to implement a logically partitioned environment consistent with embodiments of the invention.

As such, FIG. 1 includes a computing architecture characterized as a virtual machine design, as developed by International Business Machines Corporation. The networked apparatus/system 10 includes a plurality of partitions 41, 42 and 44, 45 that may share common processing resources among multiple processes within their respective server computers 31, 32. Each computer 31, 32 may rely upon a single computing machine having one or more physical processors 12, or central processing units (CPU's). The physical processors 12 may execute software configured to simulate multiple virtual processors 13.

The partitions 41, 42, 44, 45 may logically comprise a portion of a system's physical processors 12, memory and other resources as assigned by an administrator. Each partition 41, 42, 44, 45 typically hosts an operating system 48, 50, 56, 57 and may have multiple virtual processors 13. In this manner, each partition 41, 42, 44, 45 may operate largely as if it is a separate computer.

As shown in FIG. 1, physical page tables 52, 53, 54, 55 and cache page tables 58, 59, 61, 63 are shown in FIG. 1 as being associated with respective partitions 50, 56, 57, 58. However, this association is not intended to imply that the page tables, i.e., the physical page tables 52, 53, 54, 55 and cache page tables 58, 59, 61, 63, are partition resources. For instance, the page tables may actually be resources of the hypervisors 46. As such, the placement the tables as shown in FIG. 1 is intended to more clearly show the association of each table with the respective partition. While not operating in virtualized partition memory mode, the cache page tables 58, 59, 61, 63 may operate respectively as the only page tables for accepting entries from the partitions 41, 42, 44, 45 and processors 12. The physical page table 52, 53, 54, 55 may be relatively smaller than the cache page table 58, 59, 61, 63, and may receive page entries from processors 12 while the logical partitions 41, 42, 44, 45 are in virtualized partition memory mode.

Underlying programs, called hypervisors 46, or partition managers, may generally use the physical page table 52, 53, 54, 55 to update the cache page table 58, 59, 61, 63. The hypervisors 46 typically are responsible for assigning physical resources to each partition 41, 42, 44, 45. For instance, a hypervisor 46 may intercept requests for resources from operating systems 48, 50, 56, 57 to globally share and allocate resources. If the partitions 41, 42 and 44, 45 within each server 31, 32 are respectively sharing processors 12, the hypervisor 46 allocates physical processor cycles between the virtual processors 13 of the partitions 41 and 42, 44 and 45 sharing the physical processors 12.

As shown in FIG. 1, SDR1 registers 14 may be pointed to the physical page table 52, 53, 54, 55 while in virtualized partition memory mode. A SDR1 register 14 may provide the processors 12 with the location and size of a physical page table 52. A page manager 15, 16 may be used by the hypervisor 46 to track changes to logical partition pages during migration. A background flushing task 33 may be configured to make a complete single pass through the physical page table 53, invalidating entries and updating corresponding entries in the cache page table 59.

While the physical page table 52, 53, 54, 55, cache page table 58, 59, 61, 63 and page managers 15, 16 are shown in FIG. 1 as being included within either the logical partitions 41, 42, 44, 45 or the hypervisors 46, it should be understood by one of skill in the art that the virtual nature of these features may allow that the physical page table 52, 53, 54, 55, cache page table 58, 59, 61, 63 and page managers 15, 16 could otherwise be represented at other locations within the system 10 of FIG. 1. As shown, the relative positions of the features are generally intended to represent the access, control and/or association of the physical page table 52, 53, 54, 55, cache page table 50, 55, 56, 57 and page managers 15, 16 with respect to other components of the logical partitions 41, 42, 44, 45.

Each operating system 48, 50, 56, 57 controls the primary operations of its respective logical partition 41, 42, 44, 45 in a manner similar to the operating system of a non-partitioned computer. Each logical partition 41, 42, 44, 45 may execute in a separate memory space, represented by logical memory 60. Moreover, each logical partition 41, 42, 44, 45 may be statically and/or dynamically allocated a portion of the available resources in its respective computer 31, 32 of networked system 10. For example and as discussed herein, each logical partition 41, 42, 44, 45 may share one or more physical processors 12, as well as a portion of the available memory space for use in logical memory 60. In this manner, a given processor may be utilized by more than one logical partition.

The hypervisors 46 may include a dispatcher 51 that manages the dispatching of virtual processors to physical processors on a dispatch list, or ready queue 47. The ready queue 47 comprises memory that includes a list of virtual processors having work that is waiting to be dispatched on a physical processor 12. The hypervisors 46 shown in FIG. 1 also includes physical processors 12, in addition to processor control blocks 49. The processor control blocks 49 comprise memory that includes a list of virtual processors waiting for access on a particular physical processor 12.

Additional resources, e.g., mass storage, backup storage, user input, network connections, and the like, are typically allocated to one or more logical partitions in a manner well known in the art. Resources can be allocated in a number of manners, e.g., on a bus-by-bus basis, or on a resource-by-resource basis, with multiple logical partitions sharing resources on the same bus. Some resources may even be allocated to multiple logical partitions at a time. FIG. 1 illustrates, for example, three logical buses 62, 64 and 66, with a plurality of resources on bus 62, including a direct access storage device (DASD) 68, a control panel 70, a tape drive 72 and an optical disk drive 74, allocated to a partition. Bus 64, on the other hand, may have resources allocated on a resource-by-resource basis, e.g., with local area network (LAN) adaptor 76, optical disk drive 78 and DASD 80 allocated to logical partition 42, and LAN adaptors 82 and 84 allocated to logical partition 44. Bus 66 may represent, for example, a bus allocated specifically to logical partition 44, such that all resources on the bus, e.g., DASD's 86 and 88, are allocated to the same logical partition.

An orchestrator program 85 may communicate with migrating partitions to coordinate and otherwise facilitate the migration, as described below in detail. While the orchestrator program 85 program is shown in FIG. 1 as being networked to the pair of servers 31 and 32 of system 30, one skilled in the art should appreciate that another orchestrator program may be located within a server computer 31, 32 or other location within the system 30 suitable to manage a the migration between a pair of migrating partitions.

It will be appreciated that the illustration of specific resources in FIG. 1 is merely exemplary in nature, and that any combination and arrangement of resources may be allocated to any logical partition in the alternative. For instance, it will be appreciated by one of skill in the art that in some implementations resources can be reallocated on a dynamic basis to service the needs of other logical partitions. Furthermore, it will be appreciated that resources may also be represented in terms of the input/output processors (IOP's) used to interface the computer with the specific hardware devices.

The various software components and resources illustrated in FIG. 1 may be implemented in a number of manners, including using various computer software applications, routines, components, programs, objects, modules, data structures, etc., referred to hereinafter as "computer programs," "tools," "programs" or "program code." Program code typically comprises one or more instructions that are resident at various times in various memory and storage devices in the computer, and that, when read and executed by one or more processors in the computer, cause that computer to perform the steps necessary to execute steps or elements embodying the various aspects of the invention.

Moreover, while the invention has and hereinafter will be described in the context of fully functioning computers, those skilled in the art will appreciate that the various embodiments of the invention are capable of being distributed as a program product in a variety of forms, and that the invention applies equally regardless of the particular type of computer readable medium used to actually carry out the distribution. Examples of computer readable media include, but are not limited to tangible, recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environment illustrated in FIG. 1 is not intended to limit the present invention. Though not shown in FIG. 1, for instance, one skilled in the art will appreciate that other partitions may be included within other embodiments, including a partition that comprises part of the hypervisors 46. This hypervisor partition may function in many ways like the conventional partitions 41, 42, 44, 45 (and associated operating systems), but has no user interface for the customer to protect it from failures that might otherwise come about through user interaction. Furthermore, while four logical partitions 41, 42, 44, 45 are shown in FIG. 1, one skilled in the art will appreciate that more or fewer partitions may be implemented as needed. Other alternative hardware and/or software environments may thus be used without departing from the scope of the invention.

Figure 2:
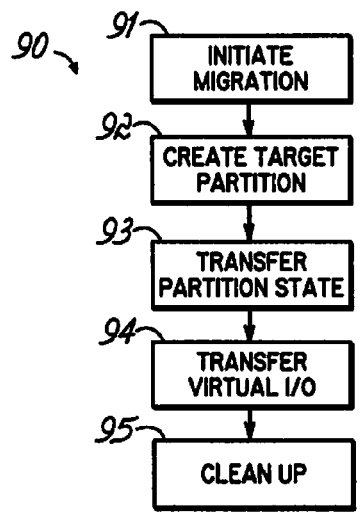
FIG. 2 is a flowchart having steps executable by the system of FIG. 1 for conducting a migration of the local partition of FIG. 1.

Processes for Updating the Cache Page Table with Entries from the Physical Page Table FIG. 2 is a flowchart 90 having steps executable by the system of FIG. 1 for executing a migration of the logical partition 42 of FIG. 1. Generally during a migration, the state of the migrating logical partition 42 is transferred to a newly created logical partition 44. The migrating partition 42 ideally continues work without interruption on the new logical partition 44 and on the target system 32.

Turning more particularly to the flowchart 90, migration processes may be initiated at block 91. Initiation processes may include prompting the orchestrator program 85 to initially communicate with a pair of logical partitions 42, 44 involved in an impending migration. The orchestrator program 85 may thus begin coordinating and otherwise facilitating the migration.

As such, the orchestrator program 85 may initiate the creation of the target partition 44 at block 92 of FIG. 2. As discussed herein, the target partition 44 is typically located on a separate, physical computer 32, and may comprise a relatively empty framework for accommodating the state of the transferred logical partition 42. Where so configured, the target logical partition 44 may include data used by the system 10 to ensure basic firmware compatibility between the target and source logical partitions 42, 44.

Memory and other state information, e.g. processor, clock and register state information, may be transferred at block 93 from the source logical partition 42 to the target logical partition 44. System processes may continue to track changes to the state information that may occur during the migration of the memory.

Similarly, virtual I/O data may be transferred at block 94 from the source logical partition 42 to the target logical partition 44. Examples of virtual I/O may include connections from the virtual components of the migrating partition to interfaces and physical resources, e.g., discs, on the source system 31. Such connection information may be transferred at block 94 so that the migrated logical partition may near seamlessly continue its work.

While the migrated logical partition was active on the source computer 31, the partition 42 may have utilized memory and other resources reserved for the partition 42 on the source system 31. Once the partition has migrated, however, it no longer needs those resources. At block 95 of FIG. 2, the orchestrator program 85 may free up the resources for other applications on the source computer 31.

Towards the end of a partition's migration, e.g., the end of virtualized partition memory mode, the partition and processors may resume using the same page table, i.e., the cache page table 59. As such, all of the bits/entries changed by the processors 12 in the physical page table 53 should be updated in their corresponding page table entries in the cache page table 59.

Figure 3:
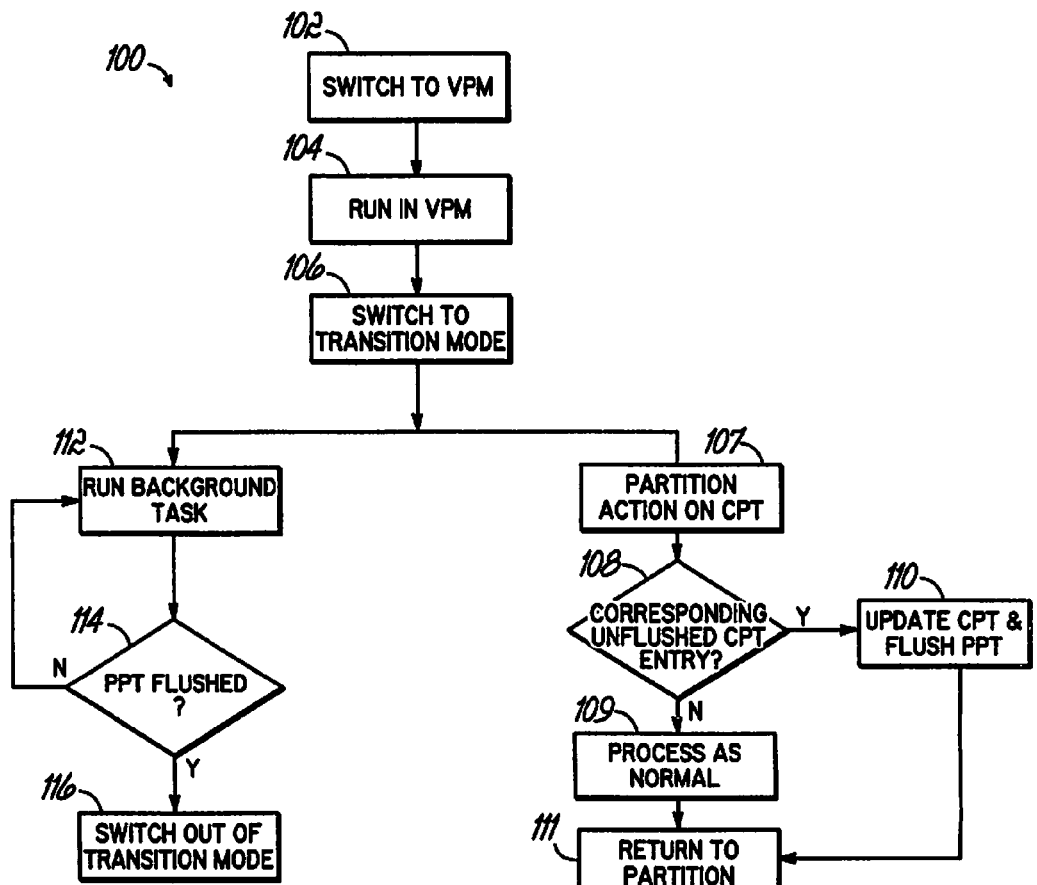
FIG. 3 is a flowchart having steps executable by the system of FIG. 1 for updating the cache page table when transitioning out of virtual partition memory mode.

FIG. 3 is a flowchart 100 showing steps executable by the system 10 of FIG. 1 for updating the cache page table 59 when transitioning out of virtualized partition memory mode. As such, the processes of the flowchart 100 may have application in the memory transfer and tracking processes of FIG. 2. Turning more particularly to block 102 of FIG. 3, a logical partition 42 may switch into virtualized partition memory mode. This mode may coincide with all of the partition's processors 12 being momentarily halted. The processors' SDR1 registers 14 (and consequently, the processors 12) may be pointed to a new page table, e.g., the physical page table 53. The partition 42 may continue to use the cache page table 59.

As the partition 42 runs at block 104 in virtualized partition memory mode, page entries may be added to the physical page table 53 as the partition references memory. More specifically, the processors 12 may update bits/entries in the physical page table 53. The hypervisor 46 may maintain updates concerning the same bits in the cache page table 59.

At block 106 of FIG. 3, the partition 42 may switch into a special transition mode. During this mode, all of the partition's processors 12 may be momentarily halted and the processors' SDR1 registers 14 may be pointed back to the cache page table 59. As such, both the processors 12 and the partition 42 may use the same page table 59. The hypervisor 46 may retain knowledge of the physical page table 53.

While still in special transition mode, the hypervisor 46 may determine at block 107 that a partition 42 has initiated an action on the cache page table 59. The hypervisor 46 may then determine at block 108 if the cache page table 59 has a corresponding physical page table entry that has not been flushed. If not, then cache page table processing may occur as normal at block 109. Otherwise at block 110, the cache page table 59 may be updated from the physical page table 53 before cache page table processing. The corresponding physical page table entry may be flushed at block 110. In either case, processing may return to the partition at block 111.

Also while in special transition mode, the background flushing task 33 running at block 112 may execute in the background for short intervals of time. The background flushing task 33 may make a complete single pass through the physical page table 53 invalidating entries and updating corresponding entries in the cache page table 59. Where desired, the hypervisor 46 may run the background flushing task 33 using donated processing cycles.

The hypervisor 46 may determine at block 114 if all of the physical page table entries have been invalidated, or flushed. If not, then the hypervisor 46 may check to see if a partition initiated action has occurred at block 108 on the cache page table 59.

If the physical page table 53 has alternatively been fully flushed, then the system 10 may switch at block 116 out of the special transition mode. That is, the partition 42 may revert back to its normal operating mode. The hypervisor 46 may discard knowledge at this time of the physical page table 53.

While the present invention has been illustrated by a description of various embodiments and while these embodiments have been described in considerable detail, it is not the intention of the applicants to restrict, or in any way limit, the scope of the appended claims to such detail. For instance, another embodiment supports migration between logical partitions between computer systems of the same physical machine. As such, a computer system for purposes of such an embodiment may include a portion of a hardware machine. As such, additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of Applicants' general inventive concept.

What is claimed is:

1. A method of maintaining data integrity for a first page table configured to store a plurality of page entries made in a logically partitioned environment, the method comprising invalidating a corresponding page entry in a second page table, wherein the corresponding page entry corresponds to a page entry of the first page table and was generated during a migration of the logical partition.

2. The method of claim 1, further comprising reading through and invalidating in the second page table a plurality of entries generated during the migration of the logical partition.

3. The method of claim 2, further comprising updating the first page table with a plurality of corresponding page entries that correspond to the plurality of invalidated entries.

4. The method of claim 3, further comprising halting operation of a processor and pointing a register to the first page table, wherein the register determines where subsequent page entries of the processor are sent.

5. The method of claim 2, wherein reading through the plurality of entries further comprises reading through the plurality of entries concurrently with the invalidation of the corresponding page entry in the second page table.

6. The method of claim 2, wherein reading through the plurality of entries further comprises reading through in intervals portions of the plurality of entries.

7. The method of claim 1, further comprising generating the corresponding page entry to the second page table by sending the corresponding page entry to the second page table.

8. The method of claim 7, further comprising pointing to the second page table a register that determines where subsequent page entries of the processor are sent.

9. The method of claim 1, further comprising performing the migration of the logical partition.

10. An apparatus comprising:
a processor;
a logical partition configured to use cycles of the processor;
a first page table including a page entry made by the logical partition;
a second page table having a corresponding page entry generated during a migration of the logical partition; and
program code executable by the processor and in communication with the logical partition and the page tables, the program code configured to invalidate the corresponding page entry in the second page table.

11. The apparatus of claim 10, wherein the program code is executed by a hypervisor.

12. The apparatus of claim 10, wherein the program code initiates reading through and invalidating in the second page table a plurality of entries generated during the migration of the logical partition.

13. The apparatus of claim 12, wherein the program code initiates updating the first page table with a plurality of corresponding page entries that correspond to the plurality of invalidated entries.

14. The apparatus of claim 12, further comprising a register configured to determine where subsequent page entries are sent, wherein the program code initiates pointing the register to the first page table.

15. The apparatus of claim 10, wherein the program code initiates reading through the plurality of entries concurrently with the invalidation of the corresponding page entry in the second page table.

16. The apparatus of claim 10, wherein the program code initiates reading through in intervals portions of the plurality of entries.

17. The apparatus of claim 10, wherein the program code initiates generating the corresponding page entry to the second page table by sending the corresponding page entry to the second page table.

18. The apparatus of claim 10, wherein the program code initiates pointing to the second page table a register that determines where subsequent page entries of a processor are sent.

19. The apparatus of claim 10, wherein the program code initiates flushing invalidated page entries.

* * * * *